United States Patent Office 3,336,116
Patented Aug. 15, 1967

3,336,116
NUCLEAR FUEL MATERIAL OF $U_3C_3Si_2$ AND
METHOD OF PREPARATION
Pierre Blum, Philippe Guinet, and Henri Vaugoyeau,
Grenoble, France, assignors to Commissariat a l'Energie
Atomique, Paris, France
No Drawing. Filed Nov. 23, 1965, Ser. No. 517,171
Claims priority, application France, Dec. 2, 1964,
997,122
3 Claims. (Cl. 23—346)

The present invention relates to a new and novel fuel material for nuclear reactors as well as to a method of preparation of said material.

There are at present employed refractory nuclear fuels which consist of uranium carbides, nitrides or oxides or even of mixtures of each of these compounds. However, these fuels have poor mechanical properties, uranium monocarbide in particular being relatively brittle; furthermore, their thermal conductivity and particularly the thermal conductivity of the uranium oxides is fairly low, which does not permit of suitable heat transfer from the fuel to the coolant.

In order to circumvent the disadvantages presented by these fuels, this invention is accordingly directed to a new and novel nuclear fuel having improved thermal and mechanical properties; this fuel has a base of the ternary compound $U_3C_3Si_2$.

With respect to the uranium nitrides, the new fuel thus contemplated offers an advantage in that it has a lower neutron capture cross-section; however, its cross-section is higher than that of the corresponding oxides and this fuel must accordingly be considered for use in fast neutron reactors or thermal neutron reactors after slight enrichment of the uranium. The enrichment obtained is advantageously in the range of 1 to 5% by weight of uranium-235 and preferably lower than 3%.

Furthermore, the new fuel according to the invention affords high resistance to chemical corrosion; in particular, the compound $U_3C_3Si_2$ is not subject to attack by moist air and is resistant to the action of metallographic etching solutions such as, for example, the mixture of nitric acid, acetic acid and water.

The compound referred-to has a metallic character and is consequently endowed with good thermal conductivity of the same order of magnitude as that of uranium. Moreover, its mechanical properties are very superior to those of certain other refractory nuclear fuels such as uranium carbide or uranium silicides, for example, and its use can be contemplated at high temperatures which can attain approximately 1700° C.

A further object of the invention is a method of preparation of the compound $U_3C_3Si_2$ which consists in preparing an initial mixture of uranium, carbon and silicon in suitable proportions, in fusing the mixture thus obtained in an inert atmosphere, in casting the liquid mixture and in subjecting the compound thus obtained to a heat treatment at a temperature and for a period of time which are sufficient to ensure good homogenization of the mixture.

Starting materials of the initial mixture can be constituted by mixtures of the elements themselves or by suitable mixtures of their binary combinations, the choice being governed by the technological characteristics of arc melting.

The heat treatment is carried out at a temperature which is advantageously of the order of 1650° C. over a period of time comprised between 50 and 100 hours.

A better understanding of the invention will be gained from a perusal of the following description in connection with one example of practical application of the method as given without implied limitation.

There is employed as starting material a mixture which has the following composition, expressed in molecular and/or atomic percentages:

USi: 14%; Si: 16%
and
UC: 28%

The different constituents are coarsely crushed into fragments and placed in a water-cooled copper crucible of conical shape; said crucible is placed within an arc furnace, the electrode of which is of cooled copper and covered by a graphite element which has been previously degassed. The atmosphere of the furnace consists of an inert gas under low pressure of 80 to 150 mm. of mercury. Argon can be employed as an inert gas, for example.

A getter which consists, for example, of a zirconium wire heated at a low voltage, acts within the furnace and is employed for the purpose of trapping by adsorption the oxygen which is present in trace quantity in the inert gas.

The fusion process is carried out in the furnace mentioned above, and the arc employed has the following characteristics: voltage approximately 25 volts and current intensity approximately 600 amps. The fusion process can also be performed continuously, for example by making use of a device of similar design to that which is described in French patent application No. 1,302,484 as filed on June 21, 1961.

Other starting mixtures could be employed for the purpose of preparing the compound $U_3C_3Si_2$; the compositions of these mixtures as expressed in atomic and/or molecular percentages are as follows:

SiC: 28%; Si: 2% and U: 42%
or
U: 43%; C: 25% and Si: 32%

Casting is carried out in a copper crucible which is similar to the crucible employed in the fusion process but which is provided at the base with a cylindrical copper mold lined with a graphite sleeve in order to facilitate removal from the mold.

The product obtained after fusion is placed above said mold and arc-melted for a period of approximately one minute. By increasing the arc intensity to 1,000 amps, the compound is then completely melted and the liquid is poured-off into the mold.

This pouring operation makes it possible to obtain a solidified cylinder of homogeneous structure having a uniform dispersion of phases which are not in equilibrium, with the result that the subsequent heat treatment will be made more effective.

The graphite sleeve is separated from the cylinder, then the dead head (which corresponds to the top end of the cylinder) is removed by means of a diamond cutting-wheel using a special oil as cutting fluid.

The product obtained is then subjected to a heat treatment which permits of its homogenization. This treatment consists in maintaining the product at approximately 1650° C. either in a vacuum or in an inert atmosphere at atmospheric pressure over a period of 50 to 100 hours. During this process, the cylinders are supported by Carborundum grains with a view to preventing chemical contamination during heat treatment. Cylinders 16 millimeters in diameter and 30 millimeters in height are thus obtained.

As will be readily apparent, this invention is not limited to the mode of application which has been described herein by way of example and the scope of this patent extends to any alternative form which remains within the definition of equivalent means.

What we claim is:
1. A nuclear fuel, the ternary compound $U_3C_3Si_2$.
2. Method of preparation of the nuclear fuel of claim 1 comprising the steps of mixing uranium, carbon and silicon, then fusing the mixture thus obtained in an inert atmosphere, then casting the liquid mixture and then heat treating the compound thus obtained at a temperature of approximately 1650° C. for from 50 to 100 hours to obtain good homogenization of the mixture.
3. Method as described in claim 2, the starting materials of the initial mixture being the binary compounds of the elements.

No references cited.

CARL D. QUARFORTH, *Primary Examiner.*

BENJAMIN R. PADGETT, *Examiner.*

S. J. LECHERT, Jr., *Assistant Examiner.*